United States Patent
Tang et al.

(10) Patent No.: US 8,417,205 B2
(45) Date of Patent: Apr. 9, 2013

(54) ANTENNA SELECTION SCHEME FOR MULTIPLE ANTENNAE

(75) Inventors: XiangGuo Tang, Union City, CA (US); Jun Shen, Palo Alto, CA (US)

(73) Assignee: Sun Management, LLC, Cupertino, CA (US)

( * ) Notice: Subject to any disclaimer, the term of this patent is extended or adjusted under 35 U.S.C. 154(b) by 730 days.

(21) Appl. No.: 11/856,685

(22) Filed: Sep. 17, 2007

(65) Prior Publication Data

US 2009/0073062 A1    Mar. 19, 2009

(51) Int. Cl.
*H04B 7/00* (2006.01)

(52) U.S. Cl.
USPC .......... 455/272; 455/277.1; 455/422.1; 455/456.1

(58) Field of Classification Search .......... 455/272, 455/277.1, 422.1, 456.1
See application file for complete search history.

(56) References Cited

U.S. PATENT DOCUMENTS

| | | | |
|---|---|---|---|
| 7,184,777 B2 * | 2/2007 | Diener et al. | 455/456.1 |
| 2004/0192242 A1 * | 9/2004 | Dinur et al. | 455/272 |
| 2004/0192290 A1 * | 9/2004 | Muthuswamy et al. | 455/425 |
| 2009/0046573 A1 * | 2/2009 | Damnjanovic | 370/216 |

* cited by examiner

*Primary Examiner* — Sanh Phu
(74) *Attorney, Agent, or Firm* — Joe Zheng

(57) ABSTRACT

Techniques to select an antenna from a plurality of antennae used for wireless communications are described. A first embodiment of the techniques is a method to select an antenna from a plurality of antennae. The method includes monitoring at least one antenna during a fraction of at least one preamble period of a frame to derive at least one quality indicator corresponding to the antenna; storing the quality indicator derived from monitoring the antenna during the fraction of the preamble period of a frame; and selectively switching to a selected antenna after a number of frames, based on the quality indicator. A second embodiment is another method to select an antenna from a plurality of antennae. These embodiments can be applied in several wireless communication applications using multiple antennae.

20 Claims, 11 Drawing Sheets

ANTENNA SELECTION SCHEME FOR MULTIPLE ANTENNAE

BACKGROUND OF THE INVENTION

1. Field of the Invention

This invention relates to wireless voice and data communications, and more particularly to methods and systems to select an antenna in wireless transmission communication systems.

2. Description of the Prior Art

There are several wireless communication standards. For example, the Institute of Electrical and Electronic Engineers (IEEE) has established a wireless standard, IEEE 802.16e. The IEEE 802.16e standard (IEEE 802.16e) outlines Media Access Control (MAC) and Physical Layer (PHY) specifications for wireless networks. The specification of the IEEE 802.16e addresses transmission of data in wireless networks. In particular, the IEEE 802.16e standard addresses communication in wireless asynchronous transfer mode (ATM) systems, covering frequencies of operation between 2.5 gigahertz (GHz) and 6 GHz. As is known in the art, IEEE 802.16e uses a modulation method called orthogonal frequency-division multiplexing access (OFDMA), which allows communication to occur at extremely high data speeds by transmitting data over multiple frequency channels over a wide frequency range.

The IEEE 802.16e specification includes mechanisms to maximize data transmission and reception reliability in packet transmission. Typically, several processes are performed in the receiver to ultimately receive the transmitted data, including: synchronization, channel estimation and equalization, OFDM demodulation (e.g., by Fast Fourier Transforms), demapping, de-interleaving, decoding, and descrambling. The more relevant sections of the IEEE 802.16e specification for the discussion below include sections 8.4.2, 8.4.4, 8.4.6, and 8.4.9, which are hereby incorporated by reference.

The antennae used for the transmission or receipt of these packets play a crucial role. An antenna is a device that transmits or receives electromagnetic wave signals. The signals may be, for example, received by another antenna located at a proximate or a distant location. The antennae may be mounted within, for example, a transmission or receiving device in a wireless communication network. Some examples of transmission devices include wireless base station or access point devices, and mobile station devices. One example wireless communication network system is disclosed in the Mobile WiMAX Technical Overview and Performance Evaluation document prepared on behalf of the WiMAX Forum and published on Feb. 21, 2006, which is hereby incorporated by reference.

The method of selecting an antenna from a plurality of antennae to attain a superior channel is very important in maintaining a communication link. In wireless communications, multiple-antenna can significantly improve the system robustness and throughput. Typically, a receiver has a default mechanism to select a new antenna when the current antenna has an unacceptable level of quality and continues operations by using the new antenna until it degrades unacceptably. Unfortunately, since mobile station devices usually have a single radio-frequency base band (RF-BB) path, it extremely difficult for a mobile station device to determine which antenna offers the best channel without actually using the antenna. Thus, it is likely that the mobile station device will perform worse after the switch to the new antenna. When this occurs, the mobile station device often iterates through untried antennae searching for an antenna that would work. Such antenna search iterations can result in a lengthy interval of service outage for the mobile station device.

Ideally, an antenna selection (AS) scheme should choose an antenna with the best channel quality from all the available antennae. However, since in many embodiments only one RF-BB path exists in the transceiver, it is difficult to simultaneously monitor the channel quality of all the antennae. A practical way is to choose one antenna until some quality indicator, such as bit error rate (BER), frame error rate (FER), or receipt Not Acknowledged (NACK) rate, is worse than some acceptable level, then switching to another antenna. This kind of scheme does not exploit the full benefit of antenna selection diversity because its antenna selection is passive and not optimal.

Normally, an antenna selection is based on the value of a quality indicator, related either to the antenna used and/or the communication channel (e.g., an antenna gain figure, a cyclical redundancy check (CRC) parameter, a receive signal strength indicator (RSSI), a carrier to interference+noise ratio (CINR), a signal-to-noise figure, a bit error rate, a symbol error rate, or an equivalent quality indicator). The types of quality indicators may also be divided into two major categories: (1) those which are designed to monitor signal transmissions and select an antenna as the signal is received and (2) those which are designed to monitor signal transmissions and select an antenna after the signal is received.

FIG. 1 illustrates a flowchart of a method to switch among a plurality of antennae based on a quality indicator, according to the prior art. The sequence starts in operation 102. Operation 104 is next and includes monitoring over time a quality indicator relating to the use of a first antenna. Operation 106 is next and includes using the first antenna if the quality indicator does not fail, and if the quality indicator fails a pre-defined value, switching to another antenna. The method ends in operation 108. In the prior art, it should be noted that the number of available antennae is perhaps very small, so that antennae are typically chosen in one standard sequence. There is no provision in a prior art antenna selection method or module for optionally selecting the next antenna based in part on any quality indicator predicting the condition or reliability of other possible antenna choices.

In a time division multiplexed access (TDMA) wireless system, for example, the antenna selection is controlled by software or logic circuitry. In this system, a CRC parameter or an equivalent is generally used to select an antenna after the signal is received. The CRC is based on polynomial division in which each bit of a packet of data represents one coefficient of a polynomial. The polynomial is then divided by a pre-programmed polynomial to yield a quotient polynomial and in some cases a remainder polynomial. When the division yields a remainder polynomial, the system assumes that a transmission error occurred and selects another antenna. If, however, the division does not yield a remainder polynomial, the system assumes no transmission errors occurred and therefore does not select another antenna.

One example of a current antenna selection process is illustrated in FIG. 2. Comparator 202 receives inputs CRC 204 and CRC threshold 206 as inputs and then produces a result 204 coupled to the next frame antenna selection module 206. A CRC error rate that produces good speech quality is used as a threshold for selecting an appropriate antenna. If the present antenna provides a CRC error that is below the threshold value, no antenna switching occurs. However, when the CRC error rate rises above the threshold value, another antenna is selected.

While the CRC comparison provides an antenna selection by monitoring transmitted data, it has disadvantages. Its primary shortcoming is that antenna selections are not made in real time. The present antenna selected is based on a previous CRC comparison, which does not change until the antenna receives a poor quality signal. The time delay that exists between receiving an incoming signal and selecting another antenna makes the selection process susceptible to errors due to interference. A CRC selection may be accurate if a transmitter or receiver is stationary or moves at a slow rate of speed, because the communication environment is subject only to slight variations in time. However, when a transmitter or receiver moves at a high rate of speed, this time delayed process may be ineffective because it may not react to a changing environment and thus, it may be susceptible to interference.

Another technique for antenna selection monitors signal transmissions and selects an antenna as the signals are received. Preamble diversity switching is an example of a system that provides real-time measurements and real-time antenna selection. Preamble diversity switching sequentially measures the receive signal strength of a diversity of antennae at the beginning of each extended preamble. The receive signal levels of each antenna, which are the receive signal strength indicators (RSSI), are stored and compared. The antenna with the higher RSSI value is selected. When the RSSI value associated with another antenna is higher, that antenna is then selected.

The preamble antenna selection process provides the benefit of selecting an antenna as signals are received. The system is less affected by rapid environmental change. However, problems arise when differences between RSSI values are insignificant. When insignificant differences exist, the system may experience some uncertainty when selecting an antenna. This is simply because minor differences in RSSI values indicate that the signal qualities received by the antennae are similar and therefore, an antenna selection will not necessarily improve the receiving quality. Therefore, a conventional preamble diversity switching process may not be the best method for selecting an antenna.

It is not unusual for an antenna to receive a signal across a fading channel. Multiple antennae are typically used in communication systems to provide another option to turn to, in the event of poor signal reception due to a fading channel, so that a good channel with no fading can be found. Some examples of a fading channel include phase shift in the signal and multi-path interference errors. The RF energy that is transmitted between antennae can experience destructive and constructive interference due to multiple paths taken by the energy with multiple delays on the way to a receive antenna. The interference can cause a receive antenna to receive a packet in error or to miss a packet entirely.

Ideally, an antenna selection is used when a particular channel is fading due to multi-path effects so that changing from one antenna to another antenna provides another communication channel that in all probability is not fading. Trying and testing of multiple antennae typically takes place during a preamble, header, or training portion of the packet. The preamble is examined rather than the data so that no data are lost while the different antennae are being tested.

There are several reasons why this approach has been difficult to implement for the IEEE 802.16e standard, and for any other high data rate radio system. First, the packet preamble in IEEE 802.16e is quite short, because a short preamble is desirable in any high data rate communications system in order to keep the efficiency of the communications system high. If the preamble is a long period in time, then the efficiency is low. While having a short preamble is good for efficiency, the short preamble reduces the time available to test the antennae. Switching from one antenna to another antenna also takes a certain time based on the physical constraints of driving electrical switches. In addition, there is a minimum time needed to measure the signal from a given antenna to effectively determine the quality of the signal. When the measurement time (i.e., no more than the duration of the preamble) is very short, a very poor estimate of the quality may be obtained if many antennae are tested.

At higher frequencies, the signal is more directional and is more easily interrupted by relative movements of the transmitter and/or receiver. Furthermore, at higher frequencies the amount of data transmitted in a unit of time increases, creating a need to avoid or minimize interruptions caused by antenna failure. Therefore, an antenna selection should be optimized as much as possible to deal with the greater vulnerabilities and consequences of higher frequency and faster data transmission environments.

In view of the foregoing, what is needed is an improved method and system to more closely optimize the selection of an antenna from a plurality of antennae when an antenna and/or channel is degrading during use. Wideband wireless antenna applications and narrowband wireless antenna applications could both benefit from such methods and systems.

SUMMARY OF THE INVENTION

The present invention can be implemented in numerous ways, such as by a method, a circuit, or a system. Two aspects of the invention are described below.

A first aspect of the invention is directed to a method to select among a plurality of antennae based on at least one quality indicator. The method includes monitoring at least one antenna of a plurality of antennae during a fraction of at least one preamble period of a frame to derive at least one quality indicator corresponding to the at least one antenna; storing the at least one quality indicator derived from monitoring the at least one antenna during the fraction of at least one preamble period of a frame; and selectively switching to a selected antenna of the plurality of antennae after a number of frames, based on the at least one quality indicator.

A second aspect of the invention is directed to a method to select among a plurality of antennae based on at least one quality indicator. The method includes monitoring at least one antenna of a plurality of antennae during a fraction of at least one preamble period of a frame to derive at least one quality indicator corresponding to the at least one antenna; storing the at least one quality indicator derived from monitoring the at least one antenna during the fraction of at least one preamble period of a frame; comparing the at least one quality indicator corresponding to each antenna of the plurality of antennae; and selectively switching to a selected antenna of the plurality of antennae after a number of frames, based on the at least one quality indicator.

These and other objects and advantages of the invention will become apparent to those skilled in the art from the following detailed description of the invention and the accompanying drawings.

DETAILED DESCRIPTION OF THE PREFERRED EMBODIMENT

The invention provides a method and a system to more closely optimize the selection of an antenna in wireless communication systems. Various embodiments of the invention can be applied to communication applications, biological applications, medical applications, electronic applications, and any other applications where a better antenna or channel selection algorithm can be beneficially used in communications. In the specification, drawings, and claims, any instance of the term radio-frequency is defined as any electromagnetic signal frequency in the frequency range of 50,000 to 100,000,000,000 cycles per second (Hertz).

Other terms used below and in the figures are defined as follows. AS represents antenna selection. RF-BB represents radio-frequency base band. BER is bit error rate. FER is frame error rate. NACK represents Not Acknowledged, which means the reception failed and transmission should be repeated.

There are several possible antenna quality indicators besides BER, FER, or NACK, including an antenna gain figure, a cyclical redundancy check (CRC) parameter, a receive signal strength indicator (RSSI), a carrier to interference+noise ratio (CINR), a signal-to-noise figure, a symbol error rate, or an equivalent quality indicator. In certain embodiments of the invention, one or more of these quality indicators can be utilized, either separately or in combination.

Figure 1:
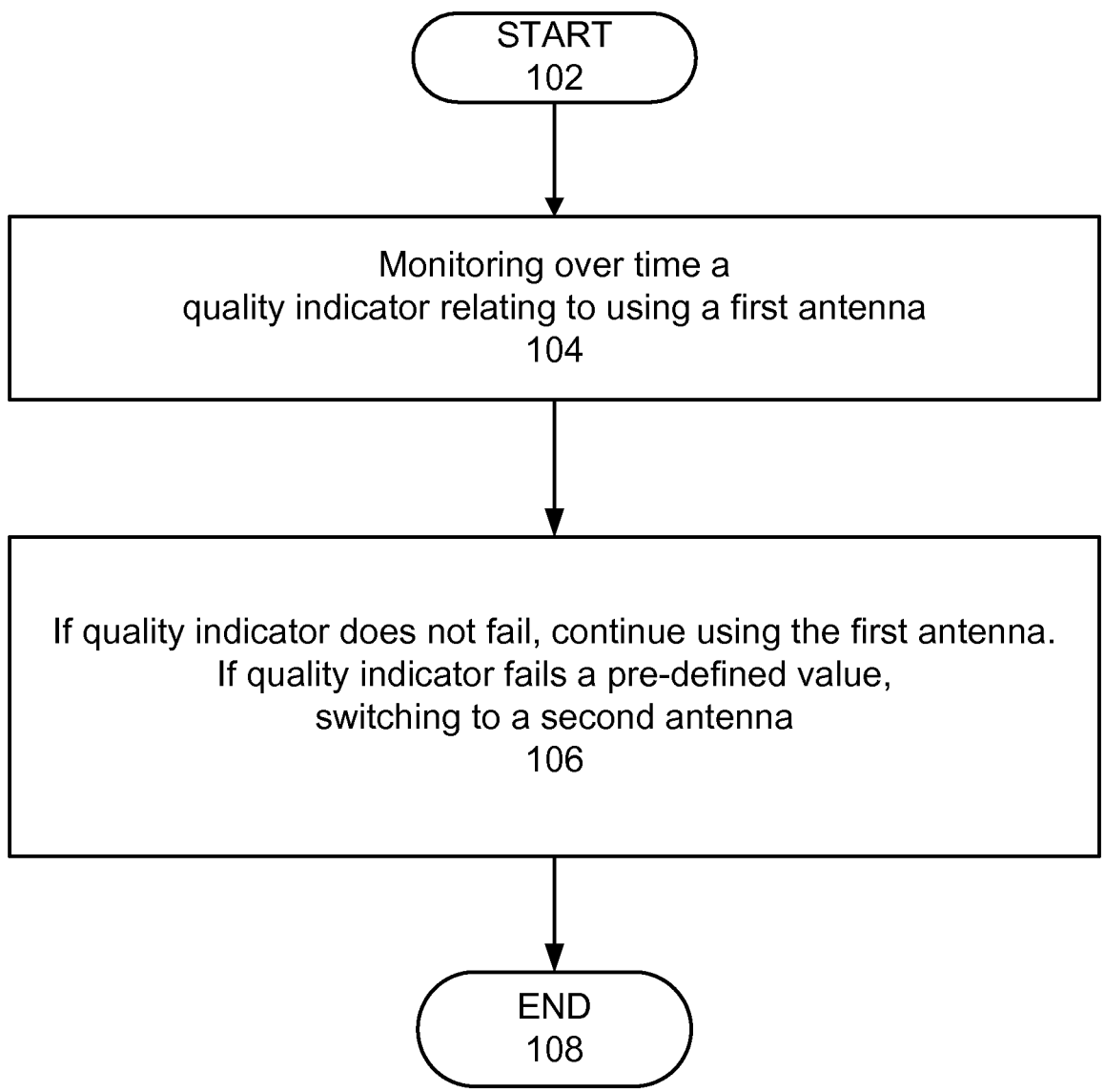
FIG. 1 illustrates a flowchart of a conventional antenna selection process for a plurality of antennae, in accordance with the prior art.
Figure 2:
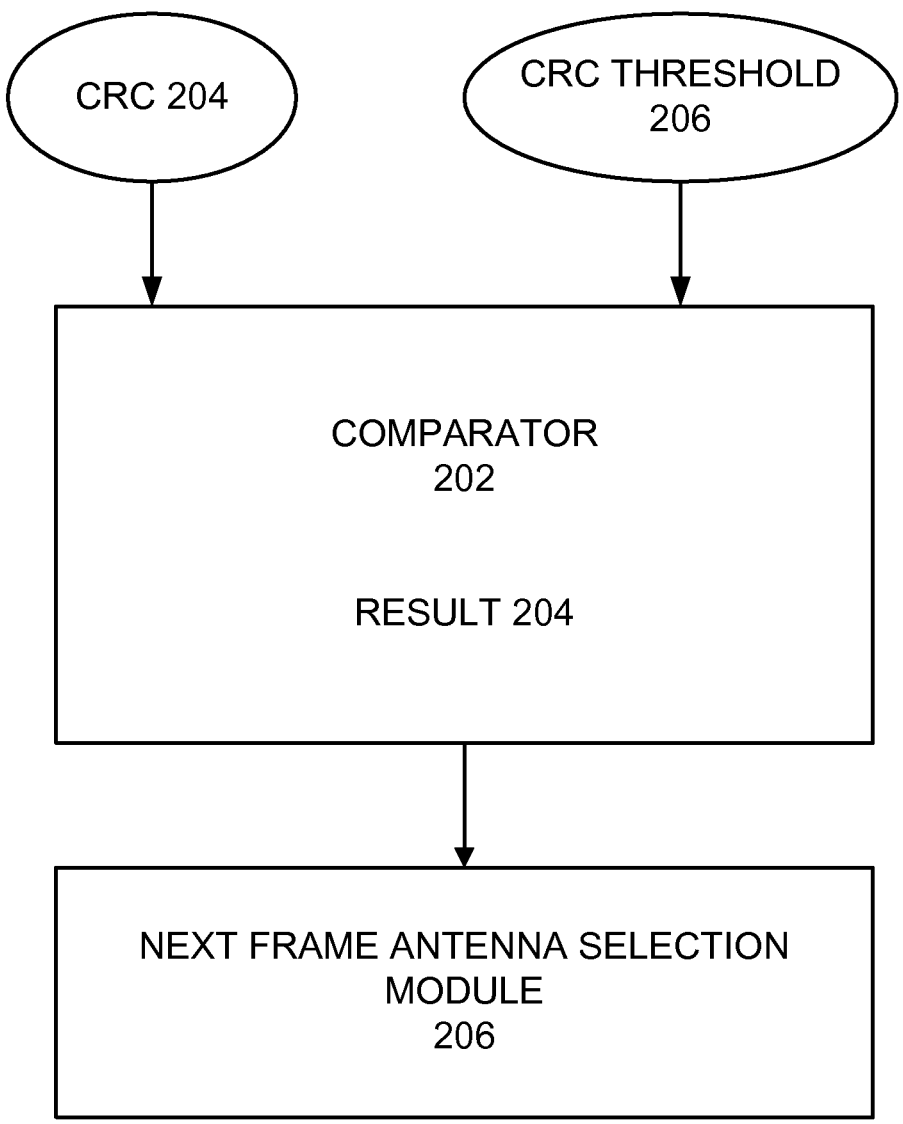
FIG. 2 illustrates a comparator for comparing CRC values, in accordance with the prior art.
Figure 3:
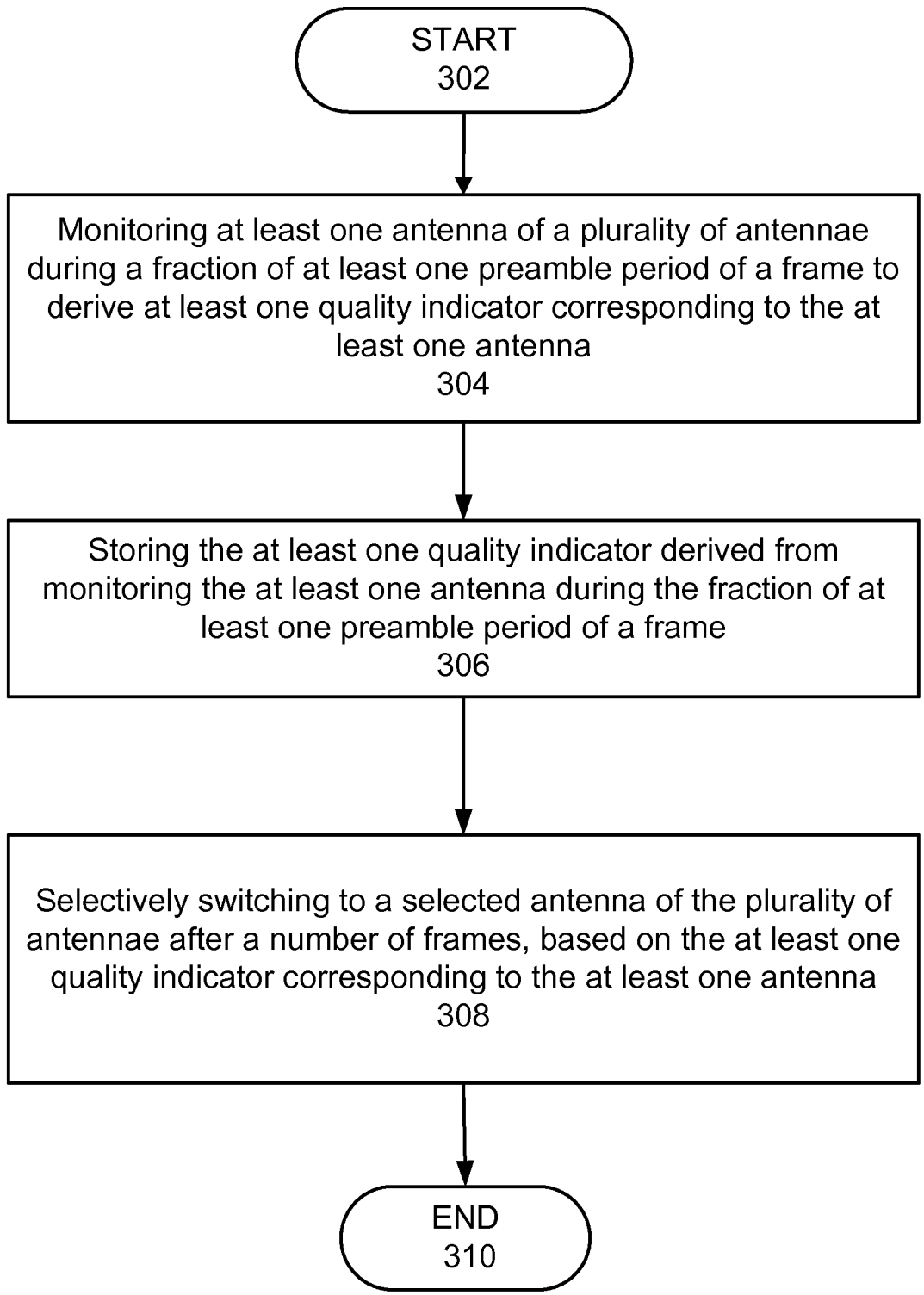
FIG. 3 illustrates a flowchart of a method to switch among a plurality of antennae based on at least one quality indicator, according to one embodiment of the invention.

FIG. 3 illustrates a flowchart of a method to switch among a plurality of antennae based on at least one quality indicator, according to one embodiment of the invention. The sequence starts in operation 302. Operation 304 is next and includes monitoring at least one antenna of a plurality of antennae during a fraction of at least one preamble period of a frame to derive at least one quality indicator corresponding to the at least one antenna. Operation 306 is next and includes storing the at least one quality indicator derived from monitoring the at least one antenna during the fraction of at least one preamble period of a frame. Operation 308 is next and includes selectively switching to a selected antenna of the plurality of antennae after a number of frames, based on the at least one quality indicator corresponding to the at least one antenna. The method ends in operation 310.

Figure 4:
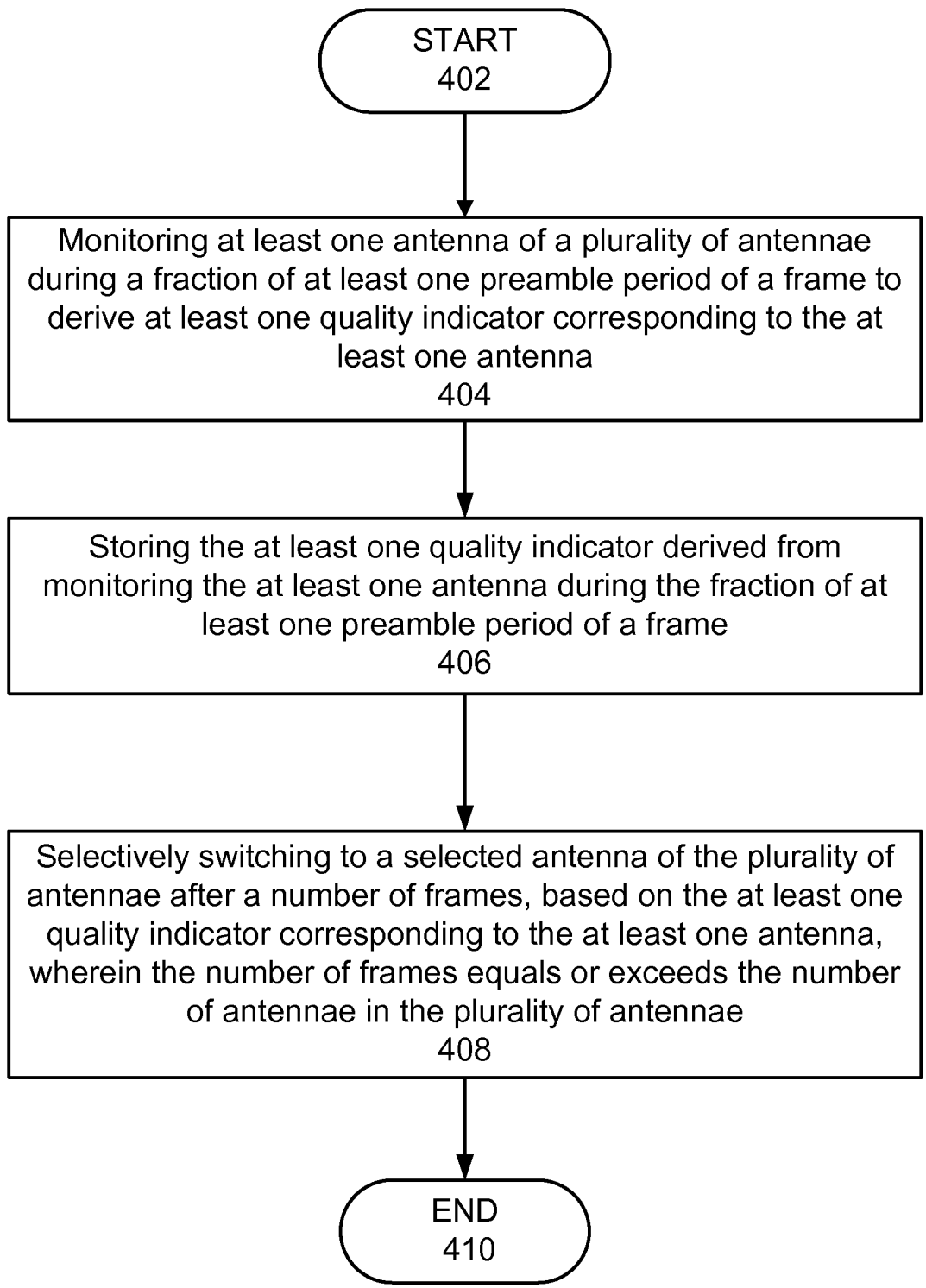
FIG. 4 illustrates a flowchart of a method to switch among a plurality of antennae based on at least one quality indicator, according to one embodiment of the invention.

FIG. 4 illustrates a flowchart of a method to switch among a plurality of antennae based on at least one quality indicator, according to one embodiment of the invention. The sequence starts in operation 402. Operation 404 is next and includes monitoring at least one antenna of a plurality of antennae during a fraction of at least one preamble period of a frame to derive at least one quality indicator corresponding to the at least one antenna. Operation 406 is next and includes storing the at least one quality indicator derived from monitoring the at least one antenna during the fraction of at least one preamble period of a frame. Operation 408 is next and includes selectively switching to a selected antenna of the plurality of antennae after a number of frames, based on the at least one quality indicator corresponding to the at least one antenna, wherein the number of frames equals or exceeds the number of antennae in the plurality of antennae. The method ends in operation 410.

Figure 5:
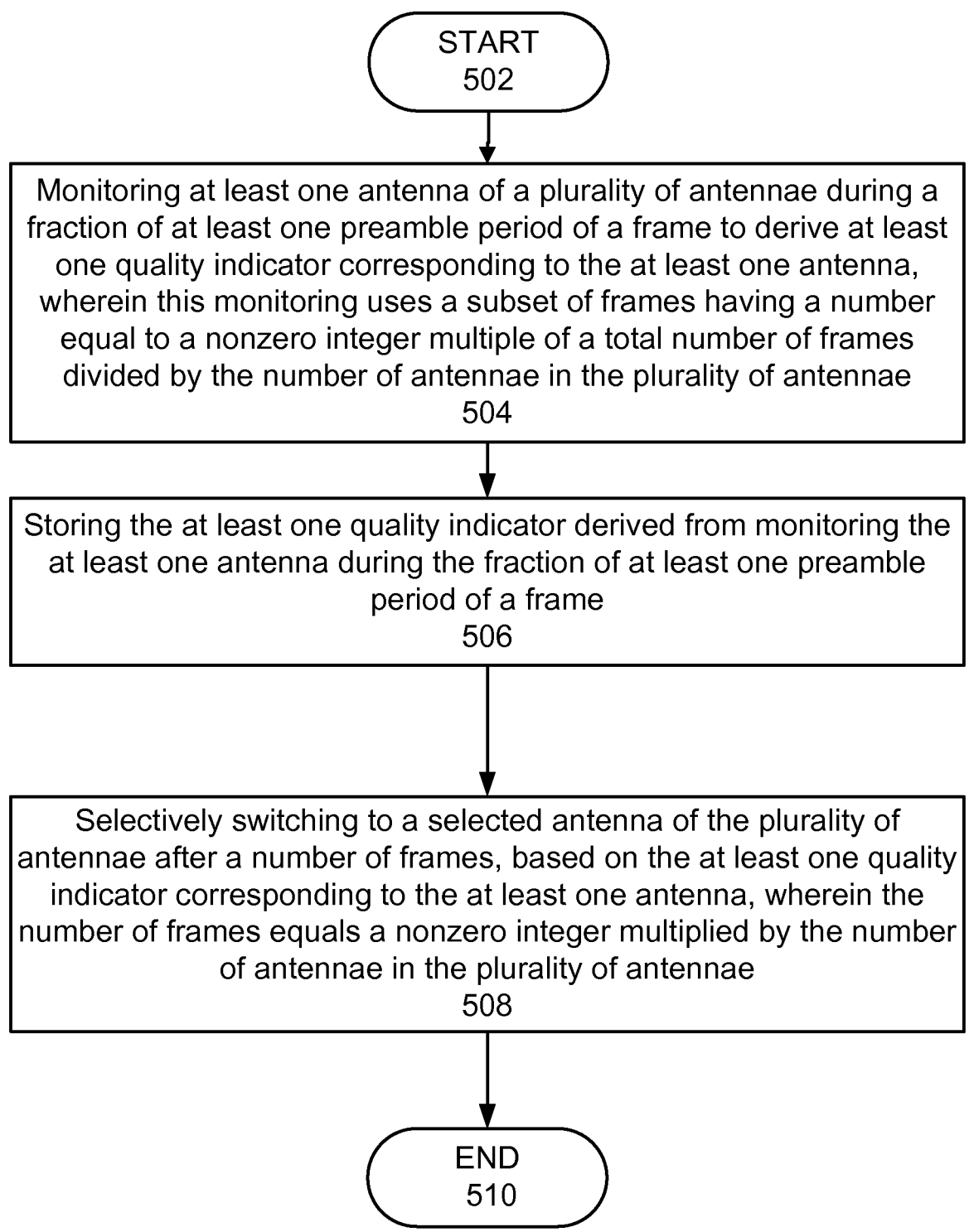
FIG. 5 illustrates a flowchart of a method to switch among a plurality of antennae based on at least one quality indicator, according to one embodiment of the invention.

FIG. 5 illustrates a flowchart of a method to switch among a plurality of antennae based on at least one quality indicator, according to one embodiment of the invention. The sequence starts in operation 502. Operation 504 is next and includes monitoring at least one antenna of a plurality of antennae during a fraction of at least one preamble period of a frame to derive at least one quality indicator corresponding to the at least one antenna, wherein this monitoring uses a subset of frames having a number equal to a nonzero integer multiple of a total number of frames divided by the number of antennae in the plurality of antennae. Operation 506 is next and includes storing the at least one quality indicator derived from monitoring the at least one antenna during the fraction of at least one preamble period of a frame. Operation 508 is next and includes selectively switching to a selected antenna of the plurality of antennae after a number of frames, based on the at least one quality indicator corresponding to the at least one antenna, wherein the number of frames equals a nonzero integer multiplied by the number of antennae in the plurality of antennae. The method ends in operation 510.

Figure 6:
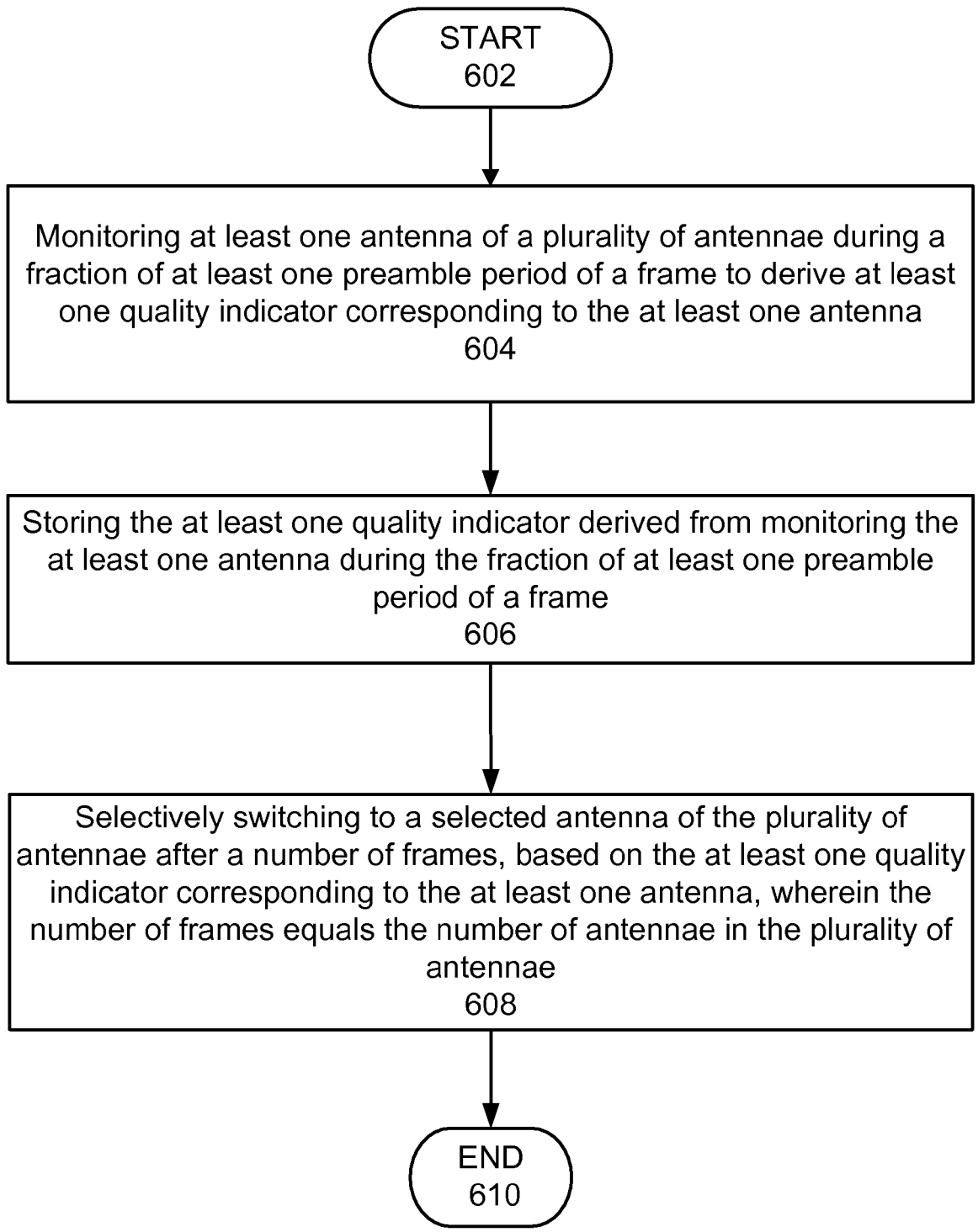
FIG. 6 illustrates a flowchart of a method to switch among a plurality of antennae based on at least one quality indicator, according to one embodiment of the invention.

FIG. 6 illustrates a flowchart of a method to switch among a plurality of antennae based on at least one quality indicator, according to one embodiment of the invention. The sequence starts in operation 602. Operation 604 is next and includes monitoring at least one antenna of a plurality of antennae during a fraction of at least one preamble period of a frame to derive at least one quality indicator corresponding to the at least one antenna. Operation 606 is next and includes storing the at least one quality indicator derived from monitoring the at least one antenna during the fraction of at least one preamble period of a frame. Operation 608 is next and includes selectively switching to a selected antenna of the plurality of antennae after a number of frames, based on the at least one quality indicator corresponding to the at least one antenna, wherein the number of frames equals the number of antennae in the plurality of antennae. The method ends in operation 610.

Figure 7:
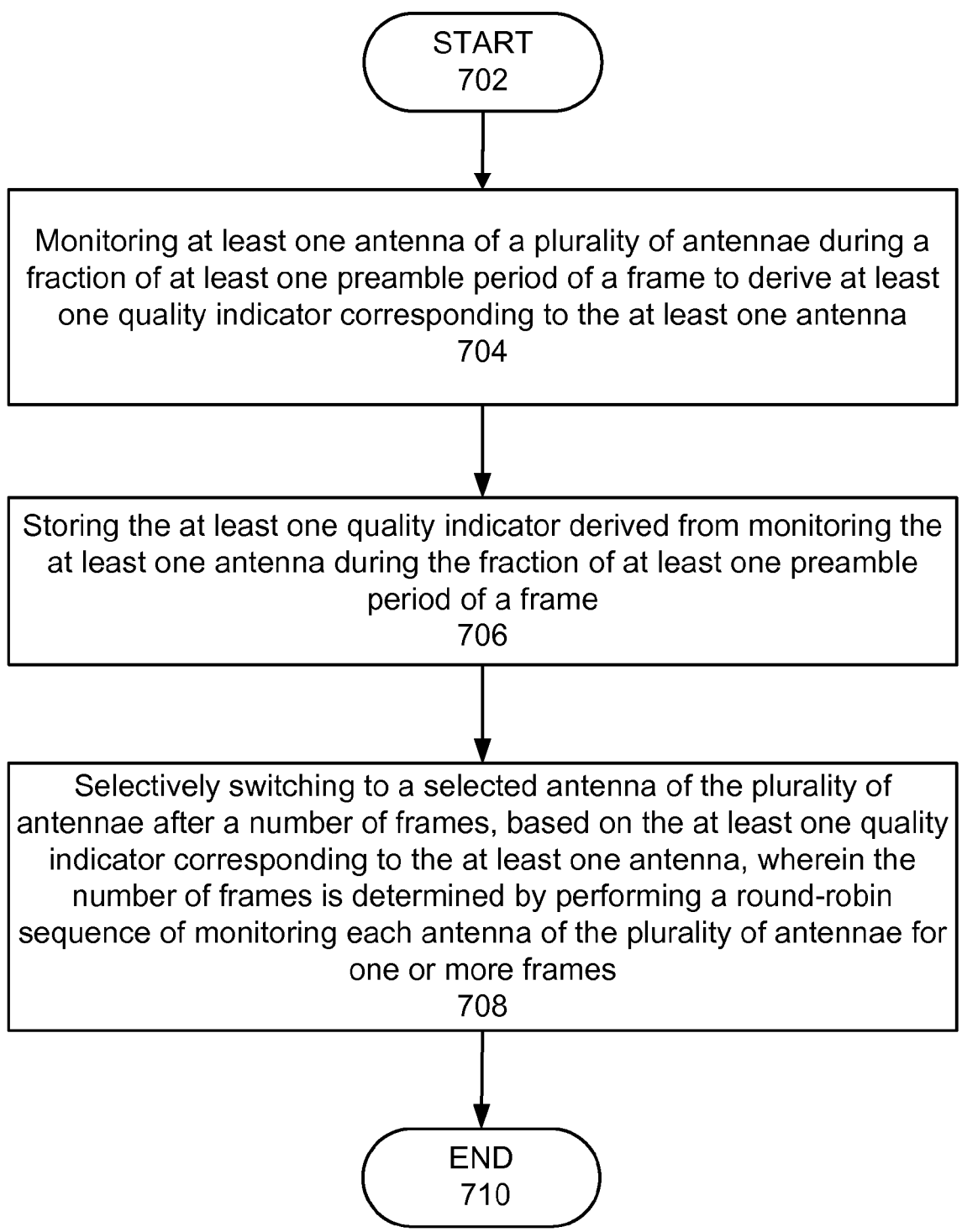
FIG. 7 illustrates a flowchart of a method to switch among a plurality of antennae based on at least one quality indicator, according to one embodiment of the invention.

FIG. 7 illustrates a flowchart of a method to switch among a plurality of antennae based on at least one quality indicator, according to one embodiment of the invention. The sequence starts in operation 702. Operation 704 is next and includes monitoring at least one antenna of a plurality of antennae during a fraction of at least one preamble period of a frame to derive at least one quality indicator corresponding to the at least one antenna. Operation 706 is next and includes storing the at least one quality indicator derived from monitoring the at least one antenna during the fraction of at least one preamble period of a frame. Operation 708 is next and includes selectively switching to a selected antenna of the plurality of antennae after a number of frames, based on the at least one quality indicator corresponding to the at least one antenna, wherein the number of frames is determined by performing a round-robin sequence of monitoring each antenna of the plurality of antennae for one or more frames. The method ends in operation 710. It should be noted that alternative embodiments of the invention, depending on the circumstances, can alternatively utilize other monitoring sequences (e.g., a limited subset, pre-selected, random, or selectively repetitive monitoring sequence, or an equivalent monitoring sequence) beside a round-robin sequence of monitoring each antenna.

Figure 8:
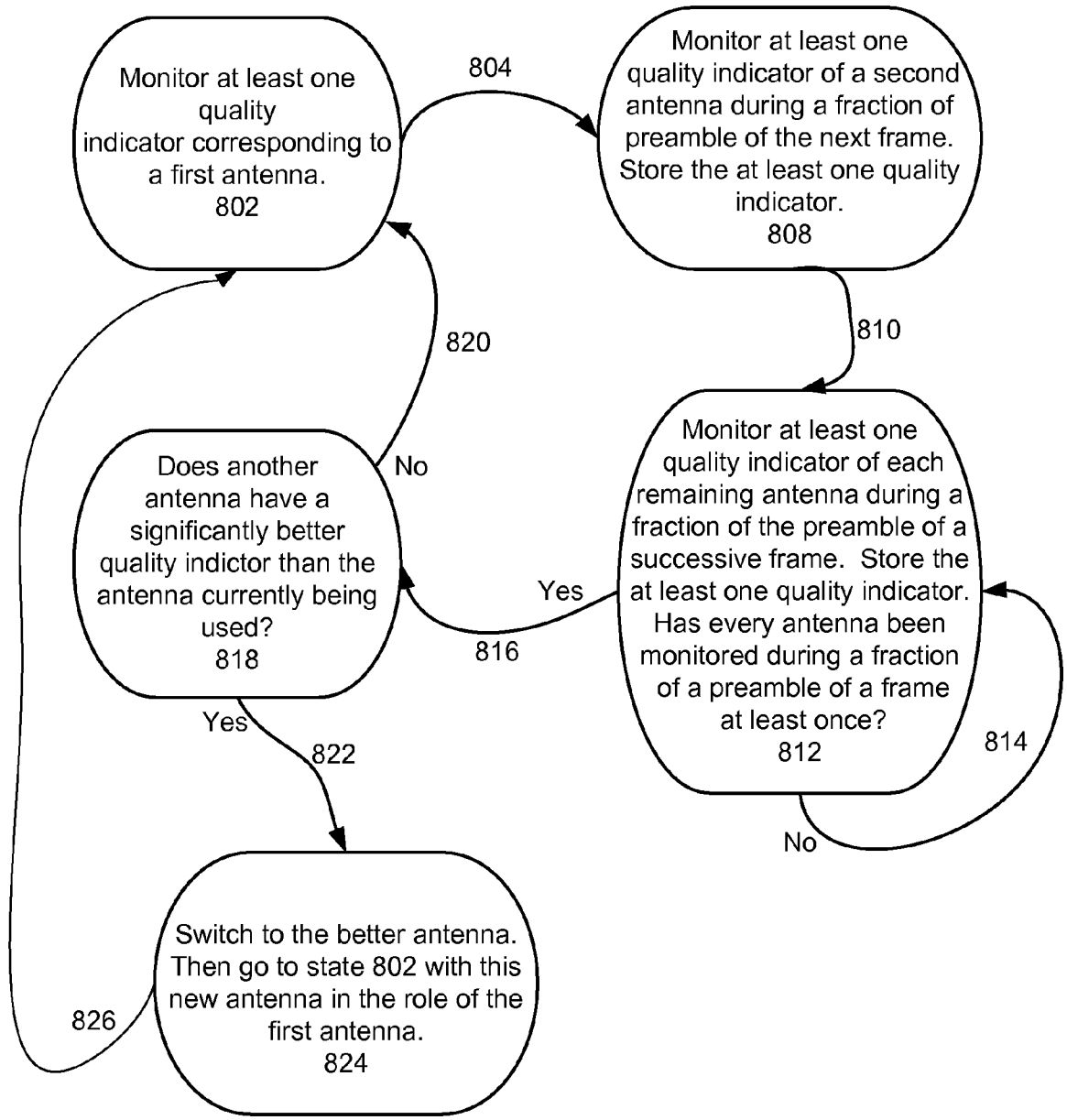
FIG. 8 illustrates a state diagram of the quality indicator testing and antenna transitions, in accordance with one embodiment of the invention.

FIG. 8 illustrates a state diagram of the quality indicator testing and antenna transitions, in accordance with one embodiment of the invention. State 802 includes monitoring at least one quality indicator related with a first antenna in a first frame. In the second frame, there is a jump 804 to state 808 includes monitoring at least one quality indicator of a second antenna during a fraction of a preamble of the second frame, and storing the at least one quality indicator. In the next frame there is a jump 810 to state 812. State 812 includes monitoring at least one quality indicator of each remaining antenna during a fraction of the preamble of a successive frame, and storing the at least one quality indicator. Has every antenna been monitored during a fraction of a preamble of a frame at least once? If there is another antenna, there is a jump 814 back to state 812. If there are no more antennae, there is a jump 816 to state 818. State 818 includes testing if another antenna has a significantly better quality indicator than the antenna currently being used? If there is no significantly better antenna, then there is a jump 820 back to the first antenna in state 802. If there is a significantly better antenna, then there is a jump 822 to state 824, which includes switching to the better antenna, then making a jump 826 to state 802 with the better antenna in the role of the first antenna.

Figure 9:
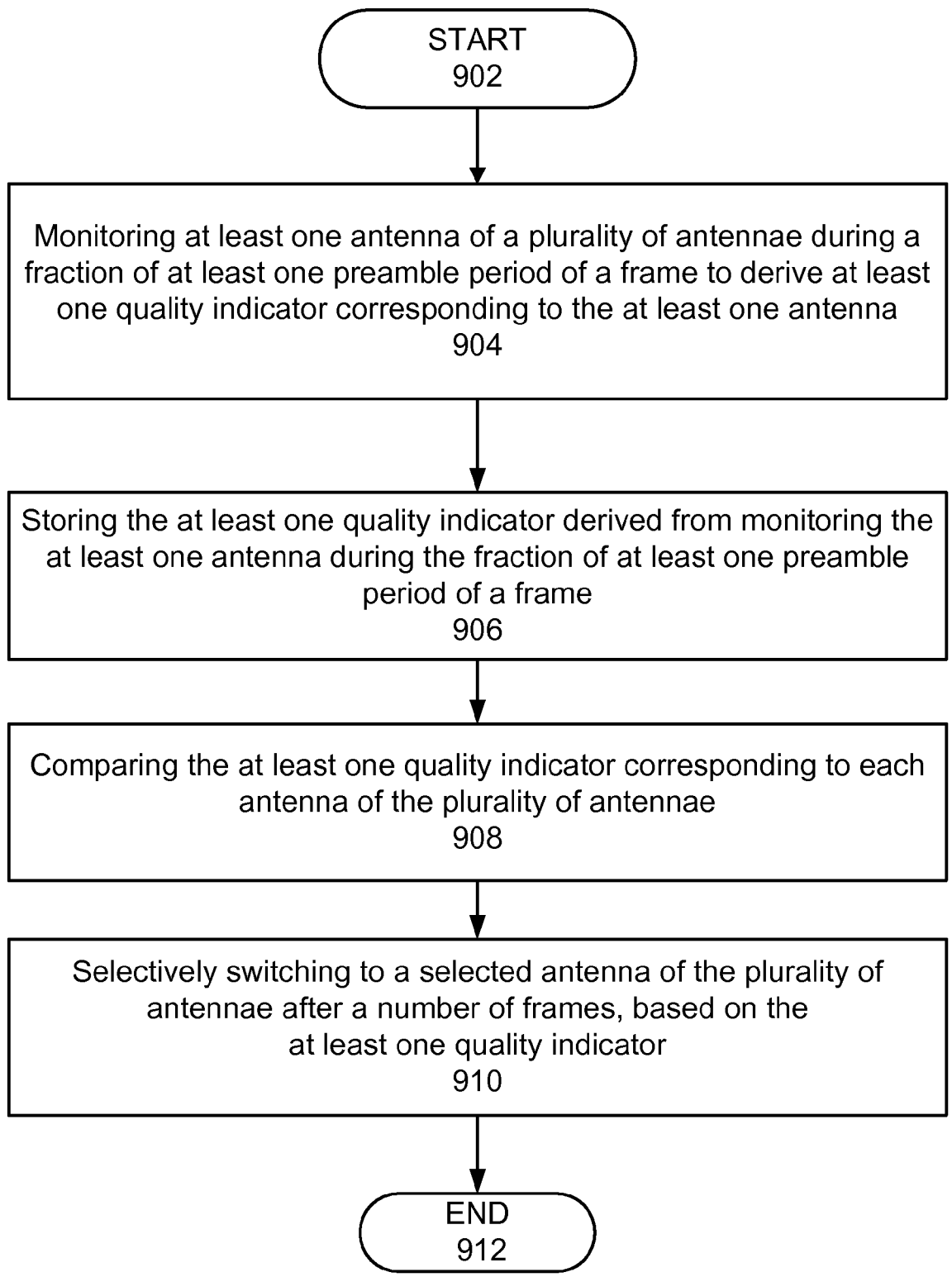
FIG. 9 illustrates a flowchart of a method to switch among a plurality of antennae based on at least one quality indicator, according to one embodiment of the invention.

FIG. 9 illustrates a flowchart of a method to switch among a plurality of antennae based on at least one quality indicator, according to one embodiment of the invention. The sequence starts in operation 902. Operation 904 is next and includes monitoring at least one antenna of a plurality of antennae during a fraction of at least one preamble period of a frame to derive at least one quality indicator corresponding to the at least one antenna. Operation 906 is next and includes storing the at least one quality indicator derived from monitoring the at least one antenna during the fraction of at least one preamble period of a frame. Operation 908 is next and includes comparing the at least one quality indicator corresponding to each antenna of the plurality of antennae. Operation 910 is next and includes selectively switching to a selected antenna of the plurality of antennae after a number of frames, based on the at least one quality indicator corresponding to the at least one antenna. The method ends in operation 912.

Figure 10:
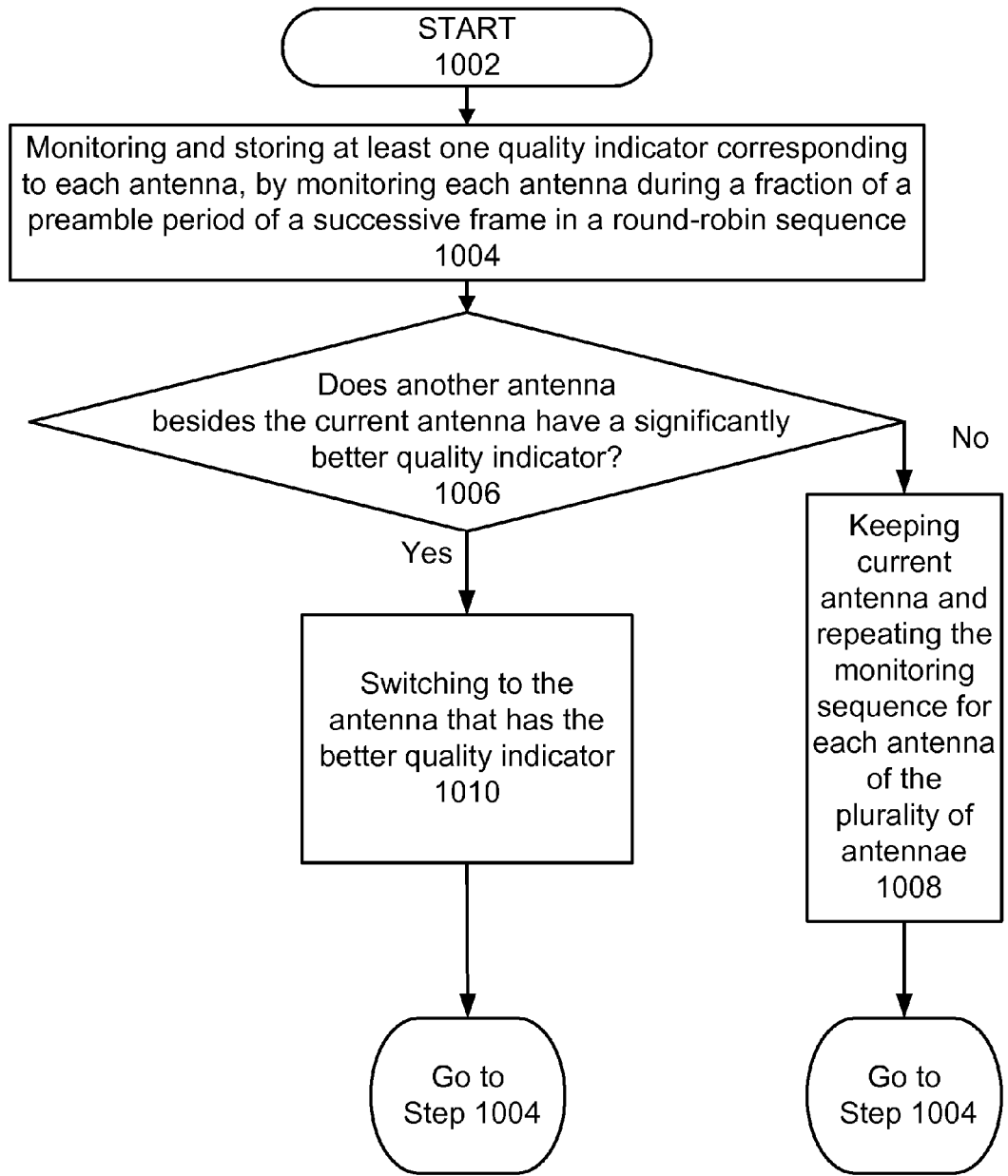
FIG. 10 illustrates a flowchart of a method to switch among a plurality of antennae based on a quality indicator, in accordance with one embodiment of the invention.

FIG. 10 illustrates a flowchart of a method to switch among a plurality of antennae based on at least one quality indicator, according to one embodiment of the invention. The sequence starts in operation 1002. Operation 1004 is next and includes monitoring and storing at least one quality indicator corresponding to each antenna of a plurality of antennae, monitoring each antenna during a fraction of a preamble period of a successive frame in a round-robin sequence. Operation 1006 is next and includes testing if another antenna besides the current antenna has a significantly better quality indicator? If the result of the test in operation 1006 is no, then operation 1008 is next and includes keeping the current antenna and repeating the monitoring sequence for each antenna of the plurality of antennae, and going to operation 1004. If the result of the test in operation 1006 is yes, then operation 1010 is next and includes switching to the better antenna that has the better quality indicator, and going to operation 1004.

In some communication systems, such as 802.16-OFDMA, at least one preamble symbol exists in each frame. The purpose of preamble is to help the mobile station (MS) to synchronize with the base station (BS) by estimating channel delay and the carrier frequency offset (CFO). After initial synchronization, it may be not necessary for the MS to use the preamble in each frame to re-do the synchronization, because the frame is short (e.g., 5 milliseconds in 802.16-OFDMA) and the channel delay and the CFO variation could be small. Thus it is feasible to temporarily switch to another antenna during the preamble time to monitor channel quality of other antennae.

Figure 11:
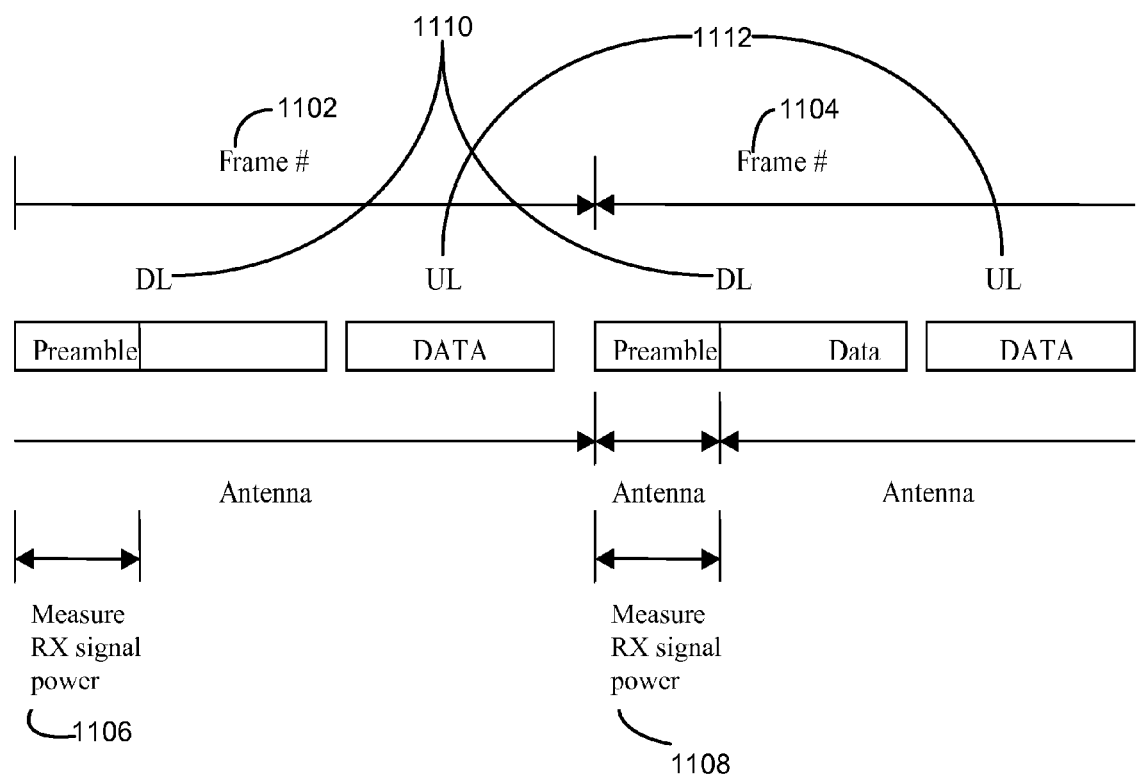
FIG. 11 illustrates a two-antenna example of a method to select among a plurality of antennae, in accordance with one embodiment of the invention.

FIG. 11 illustrates a two-antenna example of a method to select among a plurality of antennae, in accordance with one embodiment of the invention. The simplest example would be a two-antenna system. The currently selected antenna is antenna #1. For each odd number of frames 1102, one embodiment of the invention connects the RF-BB path to antenna #2 during the preamble symbol receiving time 1106 to measure a quality indicator (e.g., the power of preamble symbols received, or an equivalent quality indicator) from antenna #2. For the even number of frames 1104, the RF-BB path is still connected to antenna #1. For the even number of frames, one embodiment of the invention also measures a quality indicator (e.g., the power of preamble symbols received, or an equivalent quality indicator) from antenna #1 during the preamble symbol receiving time 1108. Such an embodiment would then compare the quality indicator (e.g., the power of preamble from two antennae) and select the antenna with the better quality indicator (e.g., the larger measured preamble power). The selected antenna will be used for signal transmission and receiving due to the symmetry of the DL channels 1110 and UL channels 1112.

Alternative embodiments of this invention utilize additional information (e.g., other quality indicators) to decide how frequently and when to switch from the currently used antenna to another antenna for measurement of a quality indicator (e.g., preamble power, or other quality indicator). In alternative embodiments, the quality indicator (e.g., preamble power, or other quality indicator) from each antenna can be averaged over a number of frames before comparison.

Several embodiments of the invention are possible. The phrase "in one embodiment" used in the specification can refer to a new embodiment, a different embodiment disclosed elsewhere in the application, or the same embodiment disclosed earlier in the application. The exemplary embodiments described herein are for purposes of illustration and are not intended to be limiting. Therefore, those skilled in the art will recognize that other embodiments could be practiced without departing from the scope and spirit of the claims set forth below.

What is claimed is:

1. A method to select an antenna among a plurality of antennae based on at least one quality indicator, the method comprising:

monitoring at least one antenna of the antennae during a fraction of at least one preamble period of a frame to derive at least one quality indicator corresponding to the at least one antenna;

storing the at least one quality indicator derived from monitoring the at least one antenna during the fraction of at least one preamble period of a frame; and selectively switching to a selected antenna of the antennae after a number of frames, based on the at least one quality indicator corresponding to the at least one antenna, wherein the number of frames equals or exceeds the number of antennae in the plurality of antennae.

2. The method of claim 1, wherein the method is implemented in a transceiver equipped with the antennae.

3. The method of claim 1, wherein the number of frames equals a nonzero integer multiplied by a number of antennae in the plurality of antennae.

4. The method of claim 1, wherein the method is implemented in a transceiver equipped with the antennae, the transceiver is one of a wireless base station, an access point device, and a mobile device.

5. The method of claim 1, wherein the number of frames is determined by performing a round-robin sequence of monitoring each antenna of the plurality of antennae for one or more frames.

6. The method of claim 1, wherein the monitoring of at least one antenna of the plurality of antennae monitors the at least one antenna during a fraction of at least one preamble period during a plurality of frames before selectively switching to the selected antenna.

7. The method of claim 1, wherein the at least one quality indicator of the selected antenna must exceed the at least one quality indicator corresponding to each antenna of the remaining antennae of the plurality of antenna by a predefined quality indicator margin, before selectively switching to the selected antenna.

8. The method of claim 1, wherein the selectively switching to a selected antenna occurs during a portion of a preamble period of one frame.

9. The method of claim 1, wherein the plurality of antennae is used in wideband applications substantially compatible with a wireless standard.

10. A method to select an antenna among a plurality of antennas based on at least one quality indicator, the method comprising:
monitoring each of the antennas during a fraction of at least one preamble period of a frame to derive at least one quality indicator corresponding to the each of the antennas;
storing the at least one quality indicator derived from monitoring the each of the antennas;
comparing the stored at least one quality indicator with the at least one quality indicator corresponding to an antenna currently being used, wherein the antenna currently being used is one of the antennas; and
selectively switching to a selected antenna of the antennas after a number of frames when the stored at least one quality indicator corresponding to the selected antenna is significantly better than the at least one quality indicator corresponding to the antenna currently being used, wherein the number of frames equals or exceeds the number of antennas.

11. The method of claim 10, wherein the antennas are equipped in a wireless transceiver.

12. The method of claim 10, wherein the number of frames equals a nonzero integer multiplied by the number of antennae in the plurality of antennae.

13. The method of claim 10, wherein the number of frames equals the number of antennae in the plurality of antennae.

14. The method of claim 10, wherein the number of frames is determined by performing a round-robin sequence of monitoring each antenna of the plurality of antennae for one or more frames.

15. A method implemented in a transceiver equipped with at least a first antenna and a second antenna and for selecting one of the at least first and second antennas for the transceiver to continue communication, the method comprising:
monitoring the first antenna during a fraction of a preamble period of a frame to derive a quality indicator corresponding to the first antenna;
comparing the quality indicator corresponding to the first antenna with a quality indicator corresponding to the second antenna currently being used; and
switching from the second antenna to the first antenna after a number of frames when the quality indicator corresponding to the first antenna is significantly better than the quality indicator corresponding to the second antenna currently being used, or continuing to use the second antenna when the one quality indicator corresponding to the first antenna is not significantly better than the quality indicator corresponding to the second antenna currently being used, wherein the number of frames equals or exceeds two.

16. The method of claim 15, wherein the quality indicator is related to one or more of a bit error rate (BER), a frame error rate (FER), or a receipt Not Acknowledged (NACK) rate.

17. The method of claim 15, wherein the transceiver has a single radio-frequency base-band (RF-BB) path.

18. The method of claim 17, wherein the transceiver is a wireless base station, an access point device, or a mobile device.

19. The method of claim 15, wherein said switching from the second antenna to the first antenna occurs during a portion of a preamble period of one frame.

20. The method of claim 15, wherein the transceiver is used in wideband applications substantially compatible with a wireless standard.

* * * * *